RECORD AND METHOD OF MAKING THE SAME

Filed May 7, 1951 4 Sheets-Sheet 1

JAMES W. BAYLESS,
INVENTOR.

BY Lyon & Lyon

ATTORNEYS

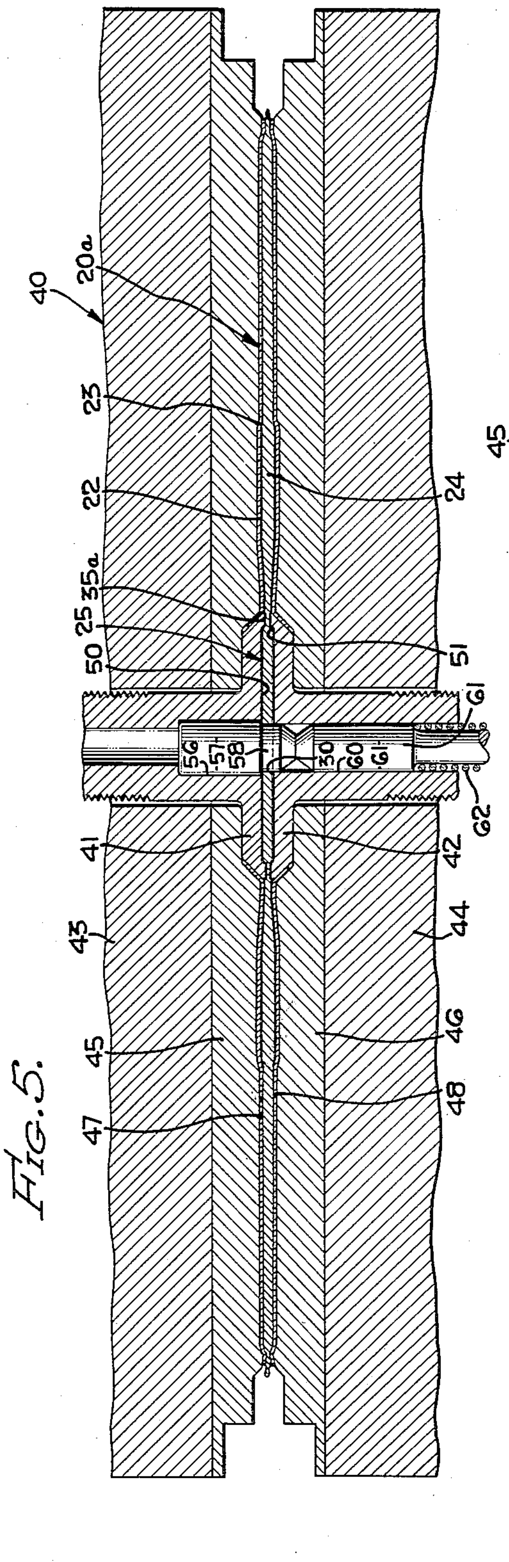
FIG. 5.
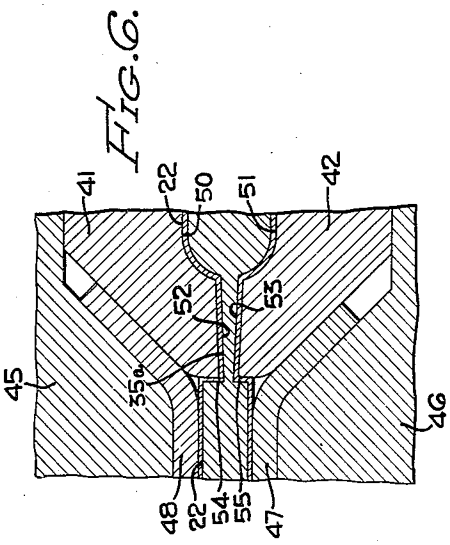
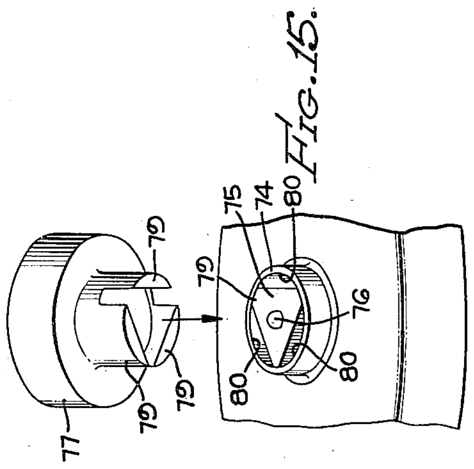
JAMES W. BAYLESS,
INVENTOR.
BY Lyon & Lyon
ATTORNEYS June 17, 1958 J. W. BAYLESS 2,839,306

RECORD AND METHOD OF MAKING THE SAME

Filed May 7, 1951 4 Sheets-Sheet 3

JAMES W. BAYLESS,
INVENTOR.

BY Lyon & Lyon

ATTORNEYS

June 17, 1958 J. W. BAYLESS 2,839,306

RECORD AND METHOD OF MAKING THE SAME

Filed May 7, 1951 4 Sheets-Sheet 4

JAMES W. BAYLESS
INVENTOR.

BY Lyon & Lyon

ATTORNEYS

United States Patent Office 2,839,306
Patented June 17, 1958

2,839,306

RECORD AND METHOD OF MAKING THE SAME

James W. Bayless, Los Angeles, Calif., assignor to Capitol Records, Inc., Los Angeles, Calif., a corporation of California Application May 7, 1951, Serial No. 224,979

4 Claims. (Cl. 274—42)

This invention relates to phonograph records and to methods of making the same.

Recent advances in the phonograph record manufacturing industry include the so-called 7-inch 45 R. P. M. record, which is adapted to be reproduced or played on a special record-changer device having a turntable speed of 45 revolutions per minute. This commercially-available machine is provided with a large capstan-type magazine or center spindle for handling the records which are provided with a correspondingly large size center hole to be accommodated on the magazine. With the advent of these 45 R. P. M. records came the development of the so-called 3-speed record changer which was intended to play the 45 R. P. M. record, the more conventional 78 R. P. M. records, and the recent 33⅓ R. P. M. records. The 3-speed changer is provided with a center pin of conventional size, much smaller than the capstan magazine referred to above, and can thus handle the 78 R. P. M. and 33⅓ R. P. M. records which have the smaller center holes. Various adapters or plug devices have been proposed and are available for reducing the relatively large diameter of the 45 R. P. M. record center hole to the smaller diameter so that such records may be played on the 3-speed changer. These adapters have not met with complete success since they are not entirely satisfactory in operation, are easily lost or misplaced, and are generally bothersome to use. Accordingly, owners of 3-speed record changers are, in effect, limited to the use of 78 R. P. M. or 33⅓ R. P. M. records.

One of the principal objects of this invention is, then, to provide a novel record which may be played on either a record changer of the type having a small center pin or on a record changer of the capstan magazine type.

Another object of this invention is to provide a novel 45 R. P. M. record which has a small center hole for use on a record changer of the type having a small center pin, and which record is provided with means for quickly and easily enlarging the center hole for use on a record changer of the type having a relatively large capstan magazine.

Another object of this invention is to provide a 45 R. P. M. record having a small center hole adapted for use on a record changer of the type having a small center pin, the record being provided with a weakened center section which may be removed by the user to increase the diameter of the center hole for playing on a record changer of the type having a relatively large capstan magazine, the weakened center section being so arranged that when it is removed for playing on the capstan-type record changer, no portions of the record interfere with the operation of the record handling knives.

A further object of this invention is to provide a 45 R. P. M. record having a push-out center section for selective use of the record on a record changer of the type having a small center pin or on a capstan-type record changer, the push-out center section being integrally connected to the record proper through an odd number of evenly-spaced weakened tab portions so that, upon removal of the center section and use on the capstan-type changer, interference of the broken tab portions with the diametrically opposed changer knives is avoided.

Yet a further object of this invention is to provide a method for making a record of the type described above and wherein the phonograph record is provided with a center section weakened on a concentric circle for finger-pressure removal, but wherein the center section is sufficiently strong to remain in place when repeatedly played on a record changer of the type having a small center pin.

Other objects and advantages of this invention it is believed will be readily apparent from the following detailed description of preferred embodiments thereof when read in connection with the accompanying drawings.

In the drawings:

Figure 5 is a vertical sectional elevation of the record stamper or mold, illustrating the molding of a record in accordance with this invention.

Figure 6 is a fragmentary sectional view, on an enlarged scale, of the record mold and illustrating the center plate structure.

Figure 15 is a diagrammatic view illustrating the punch and die for the push-out center section, the punch stripper being removed for clarity of illustration.

Figure 4:
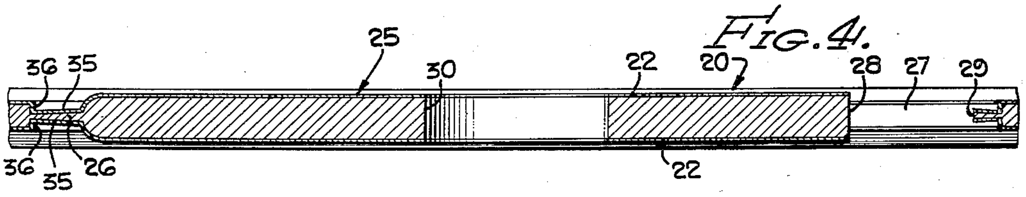
Figure 4 is a sectional elevation, on an enlarged scale, taken substantially on the line 4—4 of Figure 3.
Figure 3:
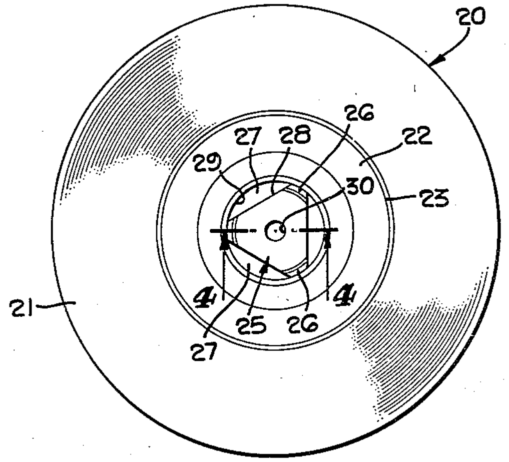
Figure 3 is a top plan view of the finished record.

Referring now to the drawings, a preferred embodiment of my invention is illustrated in Figures 3 and 4 and consists of the phonograph record generally indicated 20 which includes the conventional sound record groove section 21. Impressed on each side of the record is a conventional paper label 22 designating the record manufacturer and the title of the recorded subject-matter. These labels cover the entire area, extending inwardly from the annular inclined portion 23, of each side of the record. As will be seen best in Figure 5, the label area is provided with a thickened annular portion 24 which acts as the driving area in contacting the record changer turntable (not shown) or an adjacent record. The record 20 includes a center push-out section 25, preferably generally triangular in plan with rounded apexes or tabs 26 integrally connected with the record proper. This push-out section 25 is defined by three openings 27 in the record, each opening being formed, preferably in the manner described below, with a chordal line 28 and a circumferential line 29 on a diameter equal to that of the desired large center hole, which diameter, for playing on the conventional capstan-type record changer, is approximately 1½ inches.

Formed centrally of the push-out section 25 is a small circular opening or center hole 30. This small diameter hole is equal in diameter (about 0.285 inch) to the center holes on conventional 78 and 33⅓ R. P. M. records and is thus adapted to be handled on the conventional small center pin.

The connecting tabs 26 are each provided on both sides with a circumferential groove 35, reducing the cross-sectional area as shown. The material between the grooves progressively decreases in thickness toward the periphery of the record, having the smallest dimension at the circumferential break-out lines 36 which are on a diameter slightly larger than that of the circumferential lines 29. The connecting tabs 26 are thus weakened so that the push-out section 25 may be removed from the main body of the record with the application of finger pressure, leaving a large center hole suitable for playing on the capstan-type record changer. However, the tabs 26 are sufficiently strong to prevent accidental breaking out of the center section during the normal course of handling and playing the record on a record changer utilizing the small center pin and small center hole 30. For such a record, made by the process described below and formed of conventional vinyl resin plastic, preferable dimensions of the grooved portion of the tabs are a thickness at the break-out line of approximately 0.01 inch and a width of approximately ¼ inch. It is to be understood that these dimensions may be varied depending upon the number of tabs, record material, etc. Furthermore, it will be noted that the thickness of the center section 25 is appreciably less than the thickness of the annular driving portion 24, thus preventing contact of the center section with the turntable or an adjacent record. Such contact might result in slippage of the record when being played, due to the reduction in effective driving area.

One of the important features of this invention resides in the disposition and/or number of connecting tabs 26. It has been found that, with a record made in accordance with the above description, the center section breaks out cleanly to present a large center hole conforming to required specifications. At each break-out point a small notch is generally broken out of the record, the notch extending slightly outside the diameter of the circumferential lines 29, since, as pointed out above, the diameter of the break-out lines 36 is greater than that of the lines 29. In other words the outer bounds 36 of the concentric angular groove 35 forms a circle of slightly larger diameter than the diameter of the relatively large spindle opening formed by the circumferential lines 29. Undesirable protuberances which might reduce the effective diameter of the center hole to a point where the record could not be handled on the capstan-type magazine are thus eliminated. However, it has been found that, if these break-out notches are diametrically opposed, that is, if an even number of equally spaced tabs are formed in the record, a record changer failure may occur. The conventional capstan-type 45 R. P. M. record changers are provided with a pair of diametrically opposed changer knives which support the unplayed records and which are retractable into slots in the capstan to permit a single record to drop into playing position on the turntable. If diametrically opposed tabs 26 were used, the break-out notches would likewise be so related, and hence these notches could be brought in line with the record changer knives, causing a failure of operation. Accordingly, we prefer to provide three uniformly spaced tabs 26, although more tabs could be used so long as one of the openings 27 is diametrically opposite each of the tabs. With such an arrangement, only one of the notches could be contacted by the changer knives and in that event the operation of the record changer device would not be affected.

It should be further pointed out that that portion of the labels 22 adjacent the break-out lines 36 is scored and weakened so that little difficulty is encountered through tearing or peeling of the labels from the label area. The labels separate cleanly along the break-out line, only occasionally leaving a slightly rough edge which, again because of the relative disposition of the tabs 26, does not interfere with the operation of the record changer device.

Figure 1:
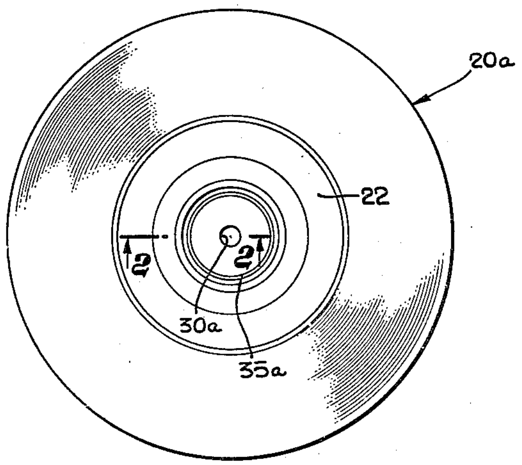
Figure 1 is a top plan view of a phonograph record embodying my invention as it appears immediately after being molded, but before the punching operation has been carried out.
Figure 2:
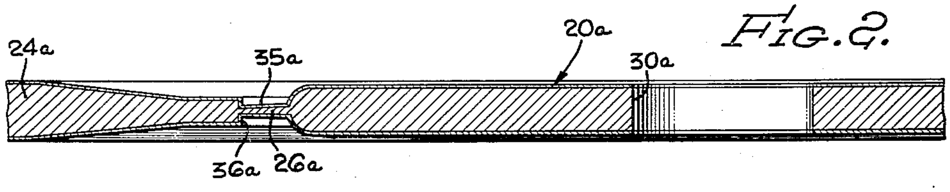
Figure 2 is a sectional elevation, on an enlarged scale, taken substantially on the line 2—2 of Figure 1.

The first step in carrying out a preferred process for making records in accordance with this invention comprises pressing or molding the record illustrated in Figure 1. This is accomplished by means of the record stamping device or mold illustrated in Figure 5. This device, generally designated 40, is conventional in design with the exception of the addition of the male and female center plates 41 and 42, respectively, and includes the usual top and bottom frames 43 and 44, top and bottom face plates 45 and 46, and upper and lower record groove stampers 47 and 48. The top and bottom frames are each provided with channels (not shown) for the circulation of steam and cold water, or may be otherwise jacketed in a conventional manner.

As shown best in Figure 6, the center plates 41 and 42 are each provided with opposed dished portions 50 and 51, the outer peripheries being provided with annular lip portions 52 and 53, the lip portions being inclined at a small angle and terminating in sharp outer peripheral edges 54 and 55, the diameter of these edges being slightly greater than that of the hole to be retained in the record after break-out of the center section. Secured to the male center plate 41 in press fit relationship in central bore 56 is a center post 57 having a reduced portion 58 protruding downwardly from the surface of the center plate. The diameter of the reduced portion is approximately equal to the diameter of the small center hole of the finished record. Slidably carried in the central bore 60 of the female center plate 42 is a sliding post 61, spring 62 being provided to urge the post 61 upwardly with respect to the plate 42.

Molding of the record is carried out by raising the top frame 43 together with its associated top face plate 45 and male center plate 41. The center post also raises and the spring 63 forces the sliding post 61 upwardly to a position wherein it protrudes above the surface of the center plate 42. The appropriate label 22, provided with a center hole, is placed over the post 61 and the "biscuit" of plastic material is placed on top of the label. The top label 22 is "hug" from the center post 57 and the then heated top section of the device 40 is brought down on the biscuit under pressure, forcing it to conform to the shape of the mold as shown in Figure 5, thus forming the record 20*a* shown in Figure 1. The mold is then cooled and the record is removed. The record 20*a* at this point is substantially identical to the finished record 20, having a small center hole 30*a* and annular groove 35*a* corresponding to the grooves 35, but lacks the openings 27 which define the center push-out section 25. It will be understood that the sharp edges 54 and 55 of the center plates 41 and 42 tend to score and weaken the labels 22 during the molding operation, so that the labels may be easily separated along the desired line if it is desired to remove the center section 25.

Figure 7:
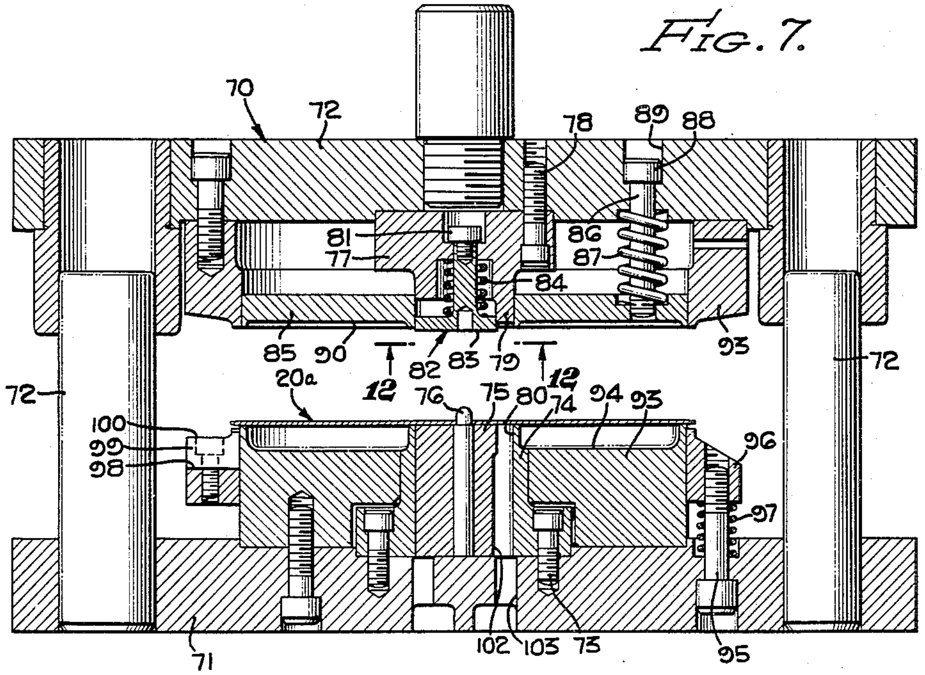
Figure 7 is a vertical sectional elevation of the punch press used in punching out portions of the record center section.
Figure 8:
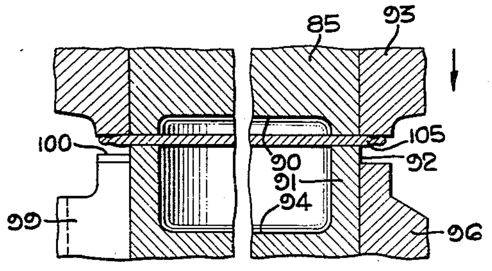
Figures 8–11 are fargmentary sectional views, illustrating the positions of the outside diameter trimming punch, die and stripper during the punching and trimming operation.
Figure 9:
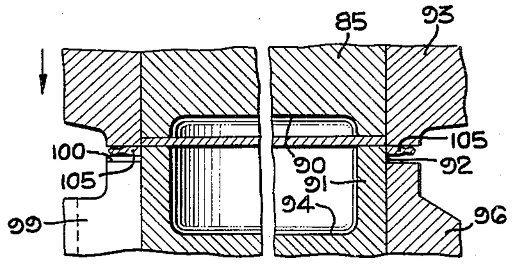
Figure 10:
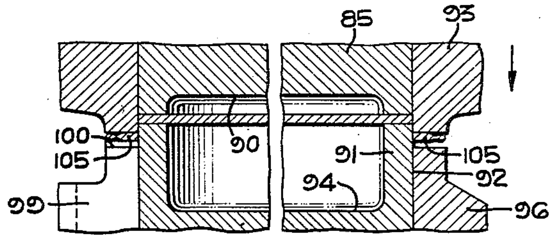

The record 20*a* thus formed is then placed in position on the punch press 70 as shown in Figure 7. The press 70 includes a die holder 71 mounted on a stationary bed (not shown) and a punch holder 72 carried on a moving platen (not shown) for vertical slidable movement on the guide pins 72. Secured to the die holder by means of bolts 73 is a die 74, cylindrical in shape and having an inside diameter substantially equal to the diameter of the push-out center. A center member 75 is carried in the die 74, the center member being roughly triangular in cross section to produce the triangular push-out center. Centrally of the center member 75 is a rounded pilot pin 76 on which the record 20a is centered. A punch member 77 is mounted on the punch holder 72 by means of the bolts 78 and is provided with three punch elements 79 shaped to enter the three channels 80 formed between the die 74 and center member 75. Slidably mounted in the opening between the punch elements 79 by means of bolt 81 is a stripper member 82. The stripper face 83 is generally triangular to conform to the shape of the push-out center 25 and is aligned with the die center member 75. Spring 84 tends to normally maintain the stripper face 83 slightly below the bottom surfaces of the punch elements 79.

Figure 13:
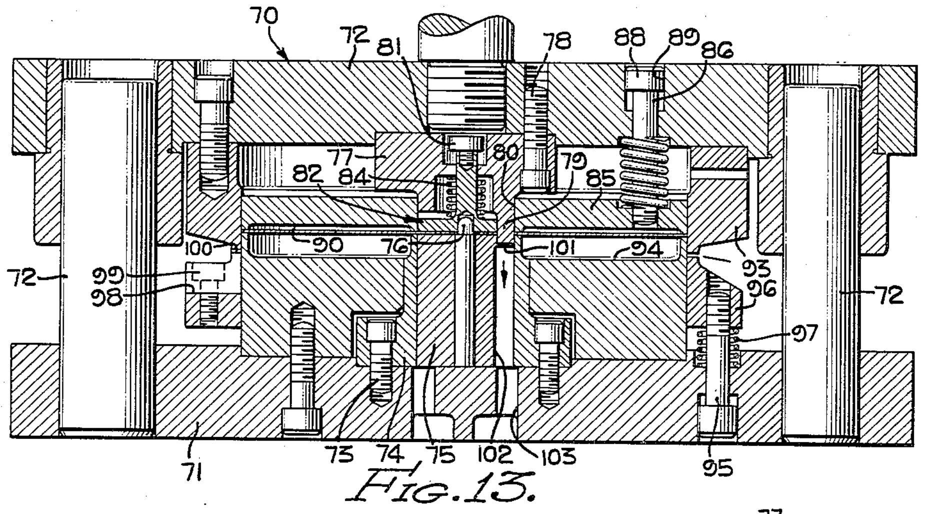
Figure 13 is a sectional elevation similar to Figure 7, but illustrating the assembly in closed position.

An annular stripper 85 is secured to the punch holder 72 by means of bolts 86, coil springs 87 tending to maintain the stripper in the position shown in Figure 7, but compressible to permit slidable movement of the stripper with respect to the punch 77 and punch holder 72, through movement of the bolt heads 88 in the bores 89 (see Figure 13). The stripper 85 is provided with an annular dished portion 90 providing clearance for the record groove section.

Also carried on the die holder 71 is an outside diameter punch 91 having an outer cylindrical surface 92 for cooperation with the inner cylindrical surface of the outside diameter die 93 mounted on the punch holder 72. The punch 91 is provided with an annular disked portion 94 similar to the disked portion 90 and for the same purpose. Slidably mounted on the die holder 71 by means of bolts 95 is an annular flash stripper 96, coil springs 97 being provided to normally maintain the stripper in the position shown in Figure 7. The stripper 96 is provided with three equally spaced slots 98 in each of which is mounted a hard steel cutter 99. As shown, the cutters 99 comprise a block having a peaked top portion 100 extending to a point just below the top surface of the punch 91.

Figure 11:
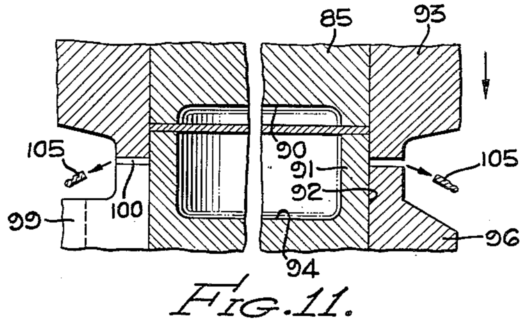
Figure 12:
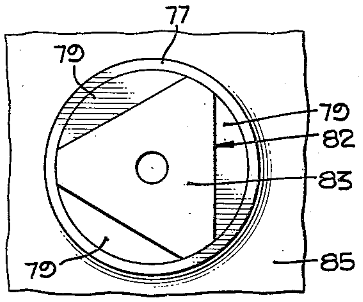
Figure 12 is a sectional view taken substantially on the line 12—12 of Figure 7.
Figure 14:
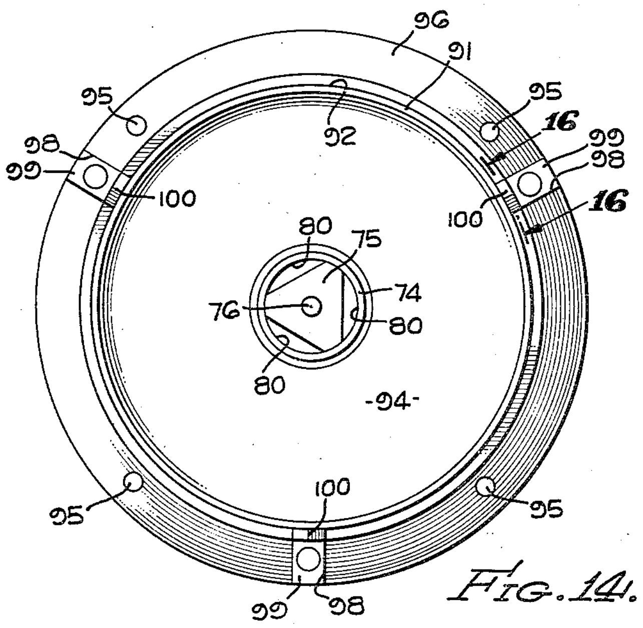
Figure 14 is a top plan view of the stripper for the outside diameter trimming punch and die.
Figure 16:
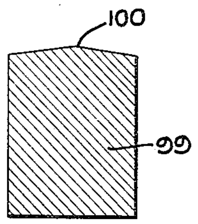
Figure 16 is a sectional elevation on the line 16—16 of Figure 14.

The operation of the punch press 70 is as follows: With the record 20a centered in place by means of the pilot pin 76, the punch holder 72 with its associated parts is moved downwardly from the position shown in Figure 7 to that shown in Figure 13. This single operation simultaneously punches the three openings 27 to form the triangular center section 25, and also trims the record to the desired outside diameter. As shown in Figures 13 and 15, the three punch elements 79 punch through the record and into the channels 80, removing three portions 101 from the record. These portions fall by gravity through the enlarged longitudinal channels 102 which form a continuation of the channels 80, and out through channels 103 formed in the die holder 71. At the same time, as shown in Figures 8–12, the outside diameter die 93 moves downwardly, cooperating with the punch 91 to trim the record to size, cutting off the outer annular portion 105 of the record which includes the molding flash. In order to permit disposal of this ring portion 105, the cutters 99 part the ring into three portions, as shown in Figure 11, the three portions falling by gravity to discard.

It will be noted that, in the closed position illustrated in Figure 13, the strippers 82, 85 and 96 are all retracted. Upon return to the open position shown in Figure 7, the strippers are extended, the strippers 82 and 85 preventing the now completed record from sticking to the punch member 77 and thus avoiding possible accidental breakout of the punch-out center 25, and the stripper 96 functioning to clear the die of scrap material.

An important feature of the above-described process resides in the step of first molding the record with the annular groove 35a, which groove corresponds to the circumferential grooves 35 on the finished record. By forming the groove 35a during the molding operation rather than as a subsequent step as by stamping the cold record, a uniformity from record to record is obtained not otherwise possible. That is, since the groove is formed while the record material is in a semifluid or plastic state, the molecular structure is relatively uniform throughout the entire record, whereas if the groove were formed through stamping or impact means on a cold record, undue stresses would be set up in the grooved section, leading to unpredictable behavior and premature break-out of the center section. Moreover, the punching of the circumferential lines 29 is more easily carried out due to the reduced thickness of the record in the area to be punched. Another important feature involves the simultaneous scoring of the record labels during the molding operation which again permits of uniformity of product and predictability of behavior of the finished record.

While I have shown and described specific embodiments of my invention, I do not limit myself to the exact details of the constructions set forth, and the invention embraces such changes, modifications and equivalents of the parts and their formation and arrangement as come within the purview of the appended claims.

I claim:

1. A phonograph record comprising a relatively thin disk including an integral center push-out section, said center push-out section having a small center hole and including spaced openings the outer peripheries of which correspond to arcuate portions of a large circle concentric with the center hole, said openings defining a plurality of tabs therebetween, one opening being diametrically opposed to each of said tabs, said tabs being provided with grooves so that the material of the record is of least thickness outside of said relatively large circle thereby defining a break-out line for said tabs, whereby said push-out center may be removed upon the application of finger pressure thereto to form a relatively large center hole in said record.

2. A phonograph record comprising a relatively thin disk having a relatively small center hole and an integral center push-out section defined by a concentric annular groove, said push-out section having portions thereof removed to provide spaced openings having peripheries which correspond to arcuate portions of a relatively large circle concentric with said small hole and slightly smaller in diameter than the outer bounds of said annular groove, said spaced openings defining an odd number of evenly spaced tabs therebetween by which said push-out section is integrally joined to said record, said annular groove providing a break-out line of reduced thickness outside of said relatively large circle, the material of the record having the least thickness at said break-out line whereby said center push-out section may be removed by breaking said tabs along said break-out line upon the application of finger pressure.

3. The phonograph record of claim 2 wherein said central push-out section is defined by concentric annular grooves on each side of said record, said annular grooves cooperating to provide a break-out line.

4. The phonograph record of claim 3 wherein the material between said annular grooves is of progressively decreasing thickness toward the periphery of the record.

References Cited in the file of this patent

UNITED STATES PATENTS

| | | |
|---|---|---|
| 1,463,235 | Whalen | July 31, 1923 |
| 1,608,621 | Sachs | Nov. 30, 1926 |
| 1,737,619 | Smith | Dec. 3, 1929 |
| 1,875,086 | McMann | Aug. 30, 1932 |
| 2,154,310 | Kinnard | Apr. 11, 1939 |
| 2,283,286 | Porth | May 19, 1942 |
| 2,283,797 | Dech | May 19, 1942 |
| 2,585,622 | Bridenbaugh et al. | Feb. 12, 1952 |
| 2,605,506 | Miller | Aug. 5, 1952 |

FOREIGN PATENTS

| | | |
|---|---|---|
| 701,518 | France | Mar. 17, 1931 |
| 124,508 | Australia | Sept. 25, 1931 |
| 425,582 | Great Britain | Mar. 18, 1935 |